Oct. 11, 1938.  F. PERRUCA  2,132,801
VARIABLE SPEED GEARING
Filed April 5, 1937   2 Sheets-Sheet 1
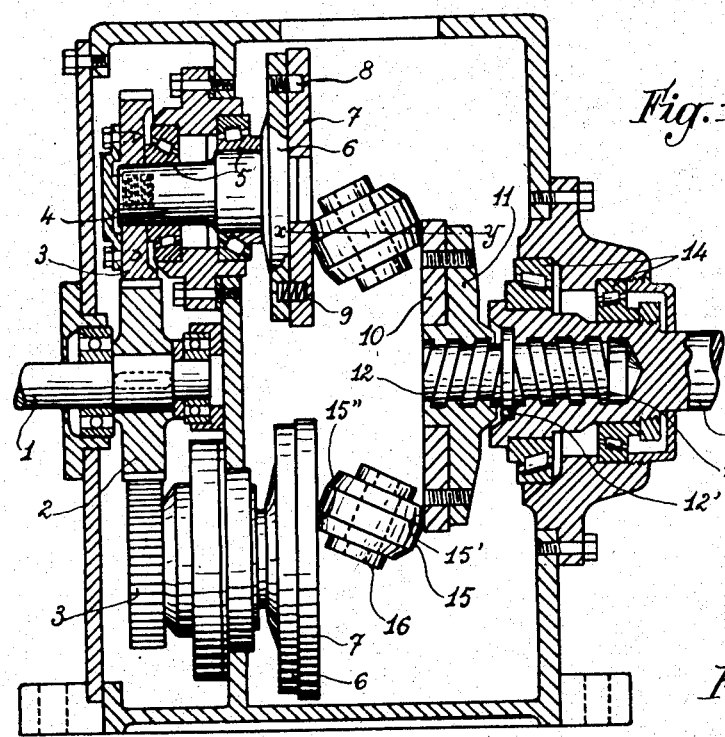
Fig. 1
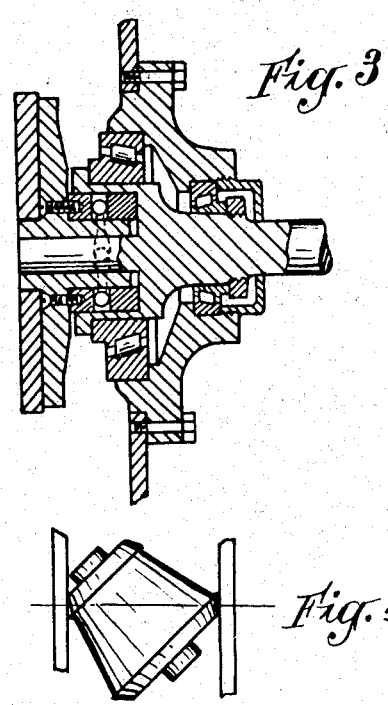
Fig. 3
Fig. 4
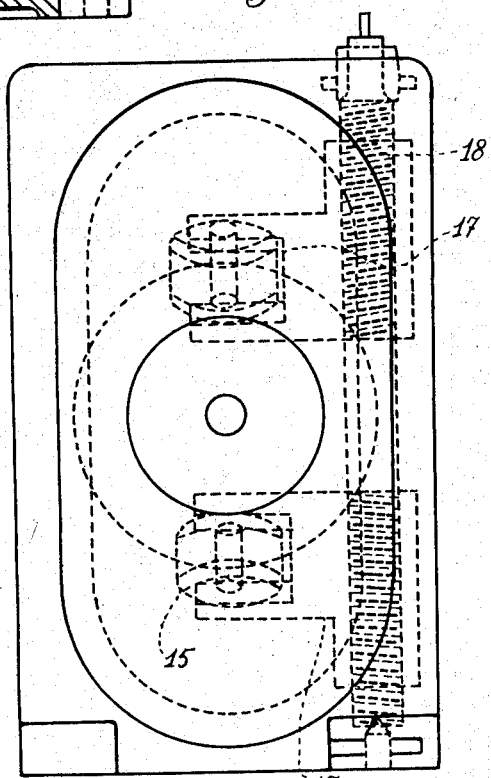
Fig. 2
INVENTOR:
Felix Perruca
By Alexander Howell
ATTORNEYS:

Oct. 11, 1938. F. PERRUCA 2,132,801

VARIABLE SPEED GEARING

Filed April 5, 1937 2 Sheets-Sheet 2

INVENTOR:
Felix Perruca
By
ATTORNEYS

Patented Oct. 11, 1938

2,132,801

UNITED STATES PATENT OFFICE 2,132,801

VARIABLE SPEED GEARING

Felix Perruca, Saint-Etienne, France, assignor to Société à responsabilité limitée "La Filière Unicum", Paris, France, a French company Application April 5, 1937, Serial No. 135,177
In France April 9, 1936

2 Claims. (Cl. 74—200)

This invention relates to a variable speed friction gearing of the kind comprising rollers in frictional engagement with discs or the like.

In such gearings the rollers are in contact with the discs along a line and the linear speed of the disc is not the same for all the points of this line. If the rollers are cylindrical, their peripheral speed is constant and slip is therefore unavoidable. It is also old to use conical rollers, and it is obvious that for a given position of a conical roller with respect to the corresponding disc (viz. when the geometrical axis of the roller passes through the center of the disc), the frictional engagement is perfect. But in such variable speed gearings the position of the roller has to be varied, and the frictional engagement is only perfect for one position, for instance, when in the position corresponding to the mean ratio of transmission. When in any other position slip is unavoidable. In practice the importance of this slip is greatly reduced by reducing as much as possible the width of the active conical face of the roller, i. e., of the face which comes into contact with the disc.

It is also known that, in friction gearings of the kind referred to, it is of advantage to use the rollers as idlers between two discs having parallel but non-coincident axes. It is then possible to equalize the contacting pressure of the discs against the roller to eliminate any twisting stress so that the roller may be mounted on a shaft of reduced diameter carried by small bearings, the whole forming an easily adjustable unit. In such an arrangement the rollers may be either cylindrical or conical, or more exactly biconical, since they must have two conical faces, each one being adapted to cooperate with one disc.

When using a bi-conical roller, care must be taken that, at the mean ratio position, the geometrical axis of the roller passes substantially through the centers of the discs, also that the width of the conical faces be reduced as much as possible, and also that the axes of pressure of the discs against the roller be disposed parallel to the axes of the discs. These conditions are not satisfactorily fulfilled in gearing arrangements heretofore used.

One object of the invention is to provide a variable speed transmission of the type above referred to, wherein it is possible to reduce the width of the conical faces of the bi-conical roller as much as may be safely done with respect to the load to be transmitted and irrespective of the exact location of the axes of pressure of the discs on the roller.

A further object of this invention is to provide variable speed transmission means wherein the diameters of the conical faces of the bi-conical roller may be different, if necessary.

In the annexed drawings:

Fig. 1 is a section of a variable speed gearing according to the present invention, with a pair of bi-conical rollers, shown at the position of lowest speed.

Fig. 2 is a side view of the same.

Fig. 3 is a sectional view of a modified construction of the disc with a device ensuring self-adjustable axial pressure.

Fig. 4 shows a bi-conical roller having two effective diameters.

Figure 5:
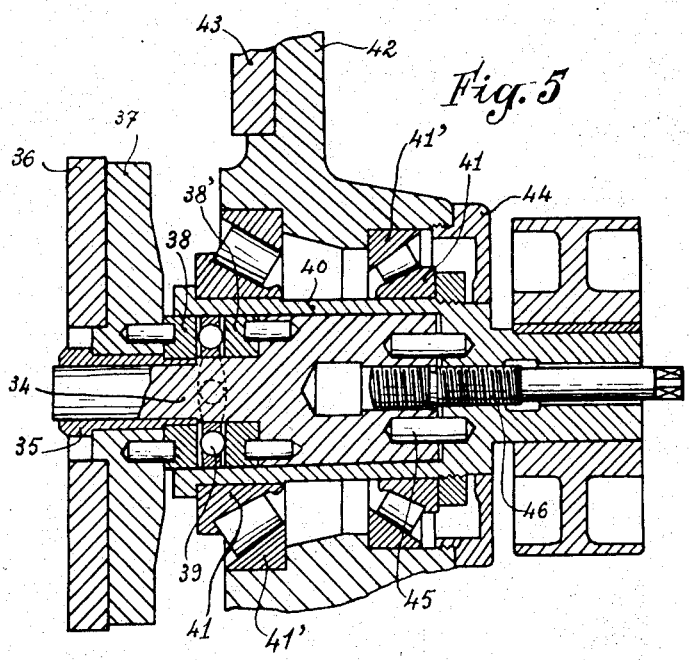
Fig. 5 is a section of a device permitting the adjustment of the axial position of the driven disc.

In the form of construction shown in Figs. 1 and 2, the gearing comprises a driving shaft 1 with a pinion 2 in mesh with two pinions 3, each keyed on a shaft 4 supported by appropriate bearings 5. Shafts 4 terminate into plates 6 supporting hardened steel discs 7; the latter are centered by their central portions and are retained by two studs 8. Springs 9 are provided opposite studs 8 to press discs 7 into engagement with the bi-conical rollers 15.

A disc 10 is axially disposed with respect to shaft 1, this disc being carried by a plate 11 screwed on the end of a shaft 12, such end being provided with a quick pitch left-hand screw-thread as shown. Shaft 12 has a collar 12' and its other end 12" is also screw threaded, but with a quick pitch right-hand screw thread which screws into the threaded bore of the driven shaft 13 supported by bearings 14.

The bi-conical friction rollers 15 are disposed between discs 7 and disc 10 as shown, the axes of the said rollers being at an angle with the faces of the discs. As shown, each roller 15 comprises two narrow conical faces 15' and 15" separated from one another by an inactive portion of such a width that the centers of the lines of contact of the conical faces 15', 15" of each roller with the corresponding discs lie on the same perpendicular $xy$ to the faces of the discs 7 and 10.

Each roller 15 is carried on ball bearings and its shaft 16 is supported by a stirrup 17 provided with a screw-threaded bore receiving a controlling screw 18 (Fig. 2). The latter is formed with two portions having left-hand and right-hand screw-threads so as to drive the respective stirrups 17 in opposite directions.

The driving shaft 1 drives the two pinions 3 and the discs 7. The latter in turn drive by friction the two rollers 15 which rotate disc 10. Owing to the torque exerted on shaft 13, plate 11 tends to be screwed off (for instance) from shaft 12 and this increases the pressure of the discs against rollers 15. If the direction of rotation is such that plate 11 tends to be screwed up on shaft 12, when the said plate reaches collar 12' shaft 12 is positively driven and tends to be screwed off from shaft 13; this also ensures the necessary pressure between the discs and rollers 15. In either case the pressure is substantially proportional to the torque developed on shaft 13.

In the modification of Fig. 3, the axial pressure is ensured by balls inserted between two undulated cam-like members, in such a way that an angular rotation of the plate with respect to the shaft in either direction results in an axial displacement of the plate towards the friction rollers.

The speed is varied by displacing the rollers in unison. When rollers 15 are brought nearer to each other their average rolling radius on each disc 8 is increased while their average rolling radius on disc 10 is decreased. The latter is thus rotated at high speed. When rollers 15 are moved in the opposite direction, the speed of disc 10 increases.

Figure 7:
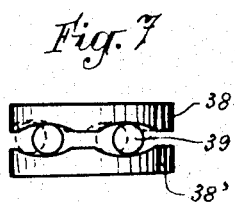
Fig. 7 shows a part of the device of Fig. 5.

Fig. 5 shows a device apt to ensure the necessary axial pressure within large limits, notwithstanding the wear. This device comprises an inner shaft 34 having a shouldered portion, this shaft receiving a loose sleeve 35 carrying a plate 37 with the friction disc 36. Plate 37 drives a ring 38 abutting against balls 39 resting against another ring 38' carried by the shouldered portion of shaft 34. As shown in Fig. 7, rings 38 and 38' are formed as cams for balls 39, as in the case of Fig. 3.

The largest portion of shaft 34 is slidable in a hollow shaft 40 carried by roller bearings 41—41' supported by a casing 42 closed by a cover 44 and secured to the main casing 43. Shaft 40 protrudes from casing 42 and carries the driving pulley.

Shaft 34 is angularly connected with shaft 40 by means of studs 45. Both shafts have a screw-threaded bore, but the screw pitches being different, and they receive a differential screw 46 projecting outwards through shaft 40.

Screw 46 permits of easily adjusting the axial position of disc 36, while rings 38, 38' ensure an increase of axial pressure proportional to the load.

Figure 6:
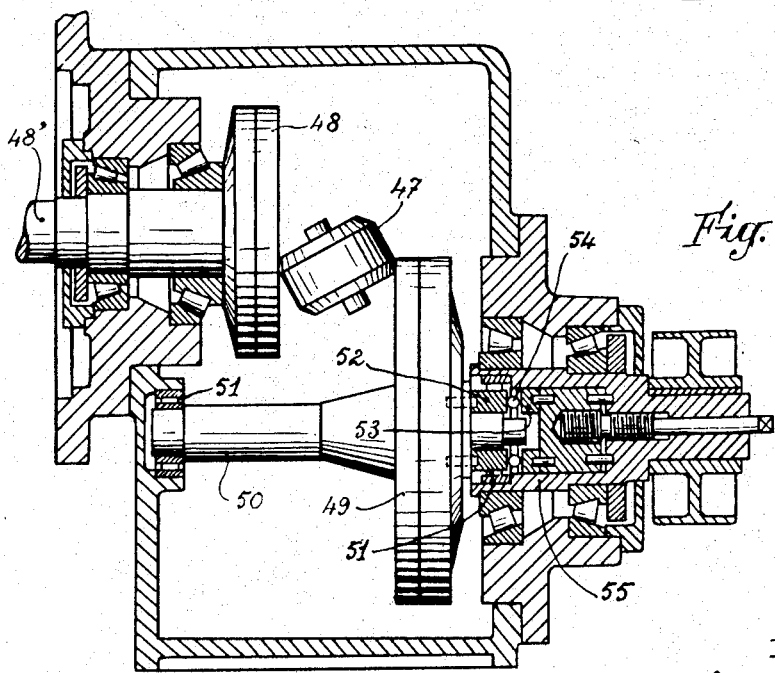
Fig. 6 shows a small variable speed gearing with but one bi-conical roller.

Fig. 6 shows a small variable speed gearing comprising a single bi-conical roller 47 between two discs 48 and 49, the former being keyed on the driving shaft 48', while the second is keyed on a shaft 50 supported at one end by a needle bearing 51, its other end being supported by a ring 52 resting against balls 54 with a counter-ring 53, rings 52 and 53 being formed as cams, as in the case of Fig. 5. Ring 53 is fixed to an inner shaft axially adjustable within a hollow driven shaft, by means of a differential screw, as in the case of Fig. 5.

Ring 52 is preferably slidably supported by the driven shaft by means of a needle bearing.

I claim:

1. A variable transmission comprising two spaced discs having parallel but non-coincident geometrical axes; and a bi-conical roller having two opposed conical faces in frictional engagement respectively with said discs, said conical faces being of reduced width and separated from one another by an inactive portion of such a width that the centers of the lines of contact of the said roller with the said discs are substantially on the same perpendicular to the faces of the said discs.

2. In a variable transmission as set forth in claim 1, the diameters of the two conical faces of the said bi-conical roller being different.

FELIX PERRUCA.